(12) United States Patent
Van

(10) Patent No.: US 11,475,452 B2
(45) Date of Patent: Oct. 18, 2022

(54) METHOD OF PROCESSING A TRANSACTION REQUEST

(71) Applicant: Touch Networks Australia Pty Ltd, Melbourne (AU)

(72) Inventor: Jason Andrew Van, Melbourne (AU)

(73) Assignee: Afterpay Corporate Services Pty Ltd, Melbourne (AU)

( * ) Notice: Subject to any disclaimer, the term of this patent is extended or adjusted under 35 U.S.C. 154(b) by 986 days.

(21) Appl. No.: 14/785,623

(22) PCT Filed: May 9, 2014

(86) PCT No.: PCT/AU2014/000505
§ 371 (c)(1),
(2) Date: Oct. 19, 2015

(87) PCT Pub. No.: WO2014/179835
PCT Pub. Date: Nov. 13, 2014

(65) Prior Publication Data
US 2016/0148206 A1 May 26, 2016

(30) Foreign Application Priority Data

May 9, 2013 (AU) .................................. 2013901648

(51) Int. Cl.
*G06Q 20/40* (2012.01)
*G06Q 30/06* (2012.01)
*G06F 21/55* (2013.01)

(52) U.S. Cl.
CPC ......... *G06Q 20/405* (2013.01); *G06F 21/552* (2013.01); *G06F 21/554* (2013.01);
(Continued)

(58) Field of Classification Search
CPC .......... G06Q 10/063; G06Q 10/06375; G06Q 10/067; G06Q 30/0224; G06Q 40/00;
(Continued)

(56) References Cited

U.S. PATENT DOCUMENTS 5,963,915 A 10/1999 Kirsch
7,137,009 B1 * 11/2006 Gordon ............... H04L 63/0807
713/185

(Continued)

OTHER PUBLICATIONS

To Personalize or Not to Personalize Online Purchase Interactions: Implications of Self-Selection by Retailers Sriram Thirumalai Information Systems Research vol. 24, No. 3, Sep. 2013, pp. 683-708.*

(Continued)

*Primary Examiner* — Richard C Weisberger
(74) *Attorney, Agent, or Firm* — Knobbe, Martens, Olson & Bear, LLP

(57) ABSTRACT

A transaction processing system (130) is arranged to receive a transaction request from a user device (110), the transaction processing system (130) comprises a cookie retriever (141) arranged to obtain a cookie (112) stored in a browser application (111) of the user device (110) containing outcome data indicative of an outcome of at least one prior transaction, a processing setter (142) arranged to determine based on the outcome data which of a plurality of transaction processes (152) is to be applied by the transaction processing system (130) to the transaction request, and a transaction processor (143) arranged to process the transaction in accordance with the determined transaction process.

18 Claims, 2 Drawing Sheets

(52) U.S. Cl.
CPC ......... *G06Q 20/40* (2013.01); *G06Q 20/4016* (2013.01); *G06Q 30/06* (2013.01)

(58) Field of Classification Search
CPC .... G06Q 30/02; G06Q 20/40; G06Q 20/4016; G06Q 30/0255; G06F 21/6263
See application file for complete search history.

(56) References Cited

U.S. PATENT DOCUMENTS

| | | | | |
|---|---|---|---|---|
| 7,493,655 | B2* | 2/2009 | Brown | G06Q 30/02 |
| | | | | 705/7.34 |
| 7,673,793 | B2 | 3/2010 | Greene et al. | |
| 7,930,197 | B2* | 4/2011 | Ozzie | G06F 17/30575 |
| | | | | 455/456.3 |
| 8,019,881 | B2 | 9/2011 | Sandhu et al. | |
| 8,739,278 | B2* | 5/2014 | Varghese | H04L 63/1416 |
| | | | | 726/22 |
| 9,508,081 | B2* | 11/2016 | Yavilevich | G06Q 30/02 |
| 2003/0083938 | A1* | 5/2003 | Smith | G06Q 30/02 |
| | | | | 705/14.53 |
| 2007/0038568 | A1* | 2/2007 | Greene | G06Q 50/188 |
| | | | | 705/50 |
| 2010/0293094 | A1 | 11/2010 | Kolkowitz et al. | |
| 2012/0233665 | A1* | 9/2012 | Ranganathan | G06F 21/33 |
| | | | | 726/4 |

OTHER PUBLICATIONS

To Personalize or Not to Personalize Online Purchase Interactions: Implications of Self-Selection by Retailers Information Systems Research (Year: 2013).* https://developer.mozilla.org/en-US/docs/Web/API/Document/cookie. (Year: 2021).*

Cryptogr. Commun. (2018) 10:777-801 https://doi.org/10.1007/s12095-018-0280-y Statistical attacks on cookie masking for RC4 Kenneth G. Paterson1 • Jacob C. N. Schuldt (Year: 2017).*

International Search Report mailed for International Application No. PCT/AU2014/000505, filed May 9, 2013, 5 pages.

* cited by examiner

METHOD OF PROCESSING A TRANSACTION REQUEST

CROSS-REFERENCE TO RELATED APPLICATIONS

This application is the U.S. National Phase under 35 U.S.C. § 371 of International Application PCT/AU2014/000505, filed May 9, 2014, which claims priority to Australian Patent Application No. 2013901648, filed May 9, 2013. The disclosures of the above-described applications are hereby incorporated by reference in their entirety and are hereby expressly made a portion of this application.

FIELD

The invention relates to a method of processing a transaction request and a transaction processing system.

BACKGROUND

By providing the facility for consumers to purchase goods and services on-line, merchants expose themselves to the potential for fraudulent transactions through these channels.

Accordingly, there is a need for techniques that mitigate against the risk of fraud.

SUMMARY

In a first aspect, the invention provides a method of processing a transaction request, the method comprising:
  receiving a transaction request from a user device at a transaction processing system;
  obtaining a cookie stored in a browser application of the user device containing outcome data indicative of an outcome of at least one prior transaction;
  determining by the transaction processing system based on the outcome data, which of a plurality of transaction processes is to be applied by the transaction processing system to the transaction request; and
  processing the transaction in the transaction processing system in accordance with the determined transaction process.

In an embodiment, determining which of a plurality of transaction processes is to be applied comprises selecting between a plurality of available processes, and at least a first transaction process contains at least one additional validation process than a second transaction process.

In an embodiment, determining which of a plurality of transaction processes is to be applied comprises selecting between a plurality of available processes, and at least a first transaction process contains at least one alternative validation process to a validation process of a second transaction process.

In an embodiment, there are a plurality of available validation processes that can be formed into the plurality of transaction processes and determining which of a the plurality of transaction processes comprises selecting which of the available validation processes will form the transaction process.

In an embodiment, the outcome data comprises a transaction score and determining which of the plurality of transaction processes is to be applied comprises determining to which of the plurality of transaction processes the score corresponds.

In an embodiment, the transaction processing system has a memory storing a plurality of ranges of scores in association with respective transaction processes such that any score uniquely corresponds to a transaction process.

In an embodiment, the method comprises setting a further cookie in the browser application of the user device based on the outcome of the determined transaction process.

In a second aspect, the invention provides a transaction processing system for processing a transaction request, the transaction processing system arranged to receive a transaction request from a user device, the transaction processing system comprising:
  a cookie retriever arranged to obtain a cookie stored in a browser application of the user device containing outcome data indicative of an outcome of at least one prior transaction;
  a processing setter arranged to determine based on the outcome data which of a plurality of transaction processes is to be applied by the transaction processing system to the transaction request; and
  a transaction processor arranged to process the transaction in accordance with the determined transaction process.

In a third aspect, the invention provides computer program code which when executed implements the above method. The invention also provides a tangible computer readable medium comprising the computer program code.

BRIEF DESCRIPTION OF DRAWINGS

Embodiments of the invention will now be described with reference to the accompanying drawings in which.

DETAILED DESCRIPTION

Figure 1:
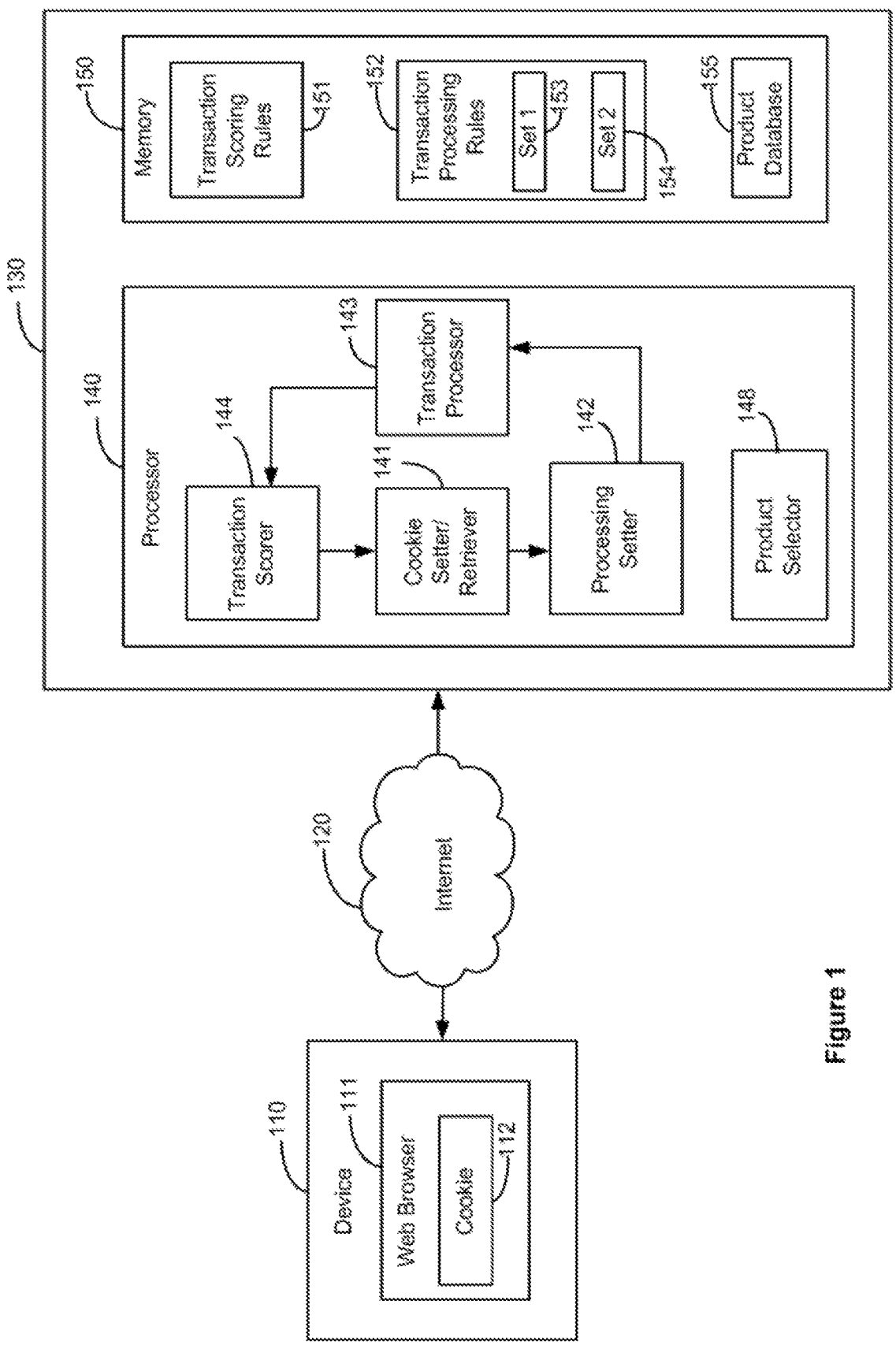
FIG. 1 is a block diagram of a transaction processing system of an embodiment.

Referring to the drawings, there is shown an embodiment of transaction processing system 130 for implementing a method for processing a transaction request. In FIG. 1, the processor 140 of transaction processing system 130 is shown implementing a number of modules based on program code and data stored in memory 150. Persons skilled in the art will appreciate that one or more of the modules could be implemented in some other way, for example by a dedicated circuit.

The method is implemented by the transaction processing system 130 in response to a customer seeking to purchase an item from the system 130. In this respect, the transaction processing system comprises a product selector 148 implemented by processor 140 which enables a user to browse and select products from the product database 155. In one embodiment, the product selector 148 provides a web interface via which a user can browse products for selection. The product selector 148 may also incorporate known functionality for of e-commerce systems, e.g. a shopping cart application to enable a user to select multiple products to be paid for in a single purchase transaction. In another embodiment, product selection may be implemented by a separate system such that the transaction processing system 130 is employed once a user has chosen products for purchase and is seeking to pay for them. In other embodiments, the transaction may be initiated in another manner, for example by the user selecting a product from an e-mail message sent to the user.

The items in product database 155 may be physical items of some particular value, for example, a mobile handset for $500 or a virtual item such as a recharge voucher for applying credit to a pre-paid mobile phone account. That is, in exchange for payment, the user is provided with a code that they can enter in order to apply credit to a prepaid mobile account and as such, may not be provided with a physical receipt.

Assuming, cookies are enabled in the web browser application 111 on the user's device 110 and the browser 111 has been used in a prior transaction, cookie 112 will include a secured algorithmic output within it that contains outcome data indicative of the outcome of at least the previous transaction outcome. In one example, the transaction outcome can be one of a number of defined outcome statuses such as: completed successful, completed declined, completed fraud risk, completed velocity breach, abandoned, etc. In another embodiment, the transaction outcome data can be a score (for example, a secured number with a range between 0 and 100 to determine the level of risk) or both a defined outcome status and a score.

During a transaction, the cookie retriever 141 of system 130 looks to the user's browser 111 to see if any previous cookies exist. If a cookie exists, then the outcome data is obtained and deciphered by the cooked retriever 141 to obtain the transaction outcome status. In one embodiment, the outcome status is then employed by the processing setter 142 to determine what rules sets and processing may be applied to the in-situ transaction. For example, the processing setter may be arranged to choose between a first set 153 and a second set 154 of transaction processing rules 152.

Thus, for example, in a high volume processing environment the processing setter 142 and processing rules 152 can be arranged so that a transaction outcome with the status "completed fraud risk" undergoes a higher detail of scrutiny than a transaction with a transaction outcome of "completed successful".

During processing of the transaction, the transaction scorer scores the current transaction based on transaction scoring rules 151 and the cookie setter 141 sets an updated cookie 112 in the browser.

In another embodiment, each successful transaction outcome contains a transaction state and a transaction score which is stored as outcome data in the cookie 112. The transaction state is a statement as to the end outcome of the transaction, such as completed successful, declined, abandoned, insufficient funds, attempted fraud, velocity breach etc. A three digit number is used to define the transaction state. For example, an approved transaction may hold a transaction state number of 167.

In one embodiment, the transaction score is a number in a defined range which may be, for example between theoretical minus infinity and infinity. In one embodiment of system 130, when the transaction processor 143 processes a transaction, any score over 99 will see that transaction fail. In one embodiment, the transaction score stored in the cookie, scores are restricted to the range to between 0000 and 9999. Scores below zero generate an automatic 0000 score and above 9999 generate a 9999 rating.

A cookie is then issued with the transaction state and transaction score tied together as a masked 7 digit number as part of the cookie's credentials. For example, an approved transaction that had an initial transaction score of 65 may have a smart cookie containing the following string:

878df765365316700653287687685 43askh32234 sr1kh312h8, with the underlined portion encoding the transaction data where the "167" identifies the transaction state (Approved) and the "0065" identifies the transaction score.

The above example indicates to the system 130 that the device having this cookie is a device on which a potentially acceptable user was going to perform a transaction and select transaction processing rules 152 accordingly.

However, if the embedded code were "2290970", this would indicate that the last transaction was an attempted fraud (where the device was used in previous fraud activities and the transaction score was 970). In this case, certain other defense mechanisms for the system may slow the transaction processing down. For example, the system may implement additional Device ID checking rules, rainbow forms and the like during the transaction processing.

If the device used for the transaction has cookies turned off, or there is no cookie, or the format of the cookie has been tampered with then the processing setter 142 is arranged such that additional measures for transaction processing are automatically enabled.

In this respect, FIG. 1 shows transaction processing rules 152 containing a first set 153 and a second set 154 of rules. The first set 153 and the second set 154 may differ from each other in that the second set 154 contains additional transaction validation processing steps that are undertaken based on the processing score. In another example, alternative transaction validation processing steps may be undertaken, for example the second set 154 may replace a processing step from the first set 153 with an alternative set.

Persons skilled in the art will also appreciate that the presence of two sets of rules in FIG. 1 is indicative only and that a number of different sets of rules may be employed depending on the degree of granularity required in processing the transactions.

Further, in one embodiment, the rules may not be established as separate sets but rather a series of different processing modules that are assembled based on the transaction outcome data that is set.

Figure 2:
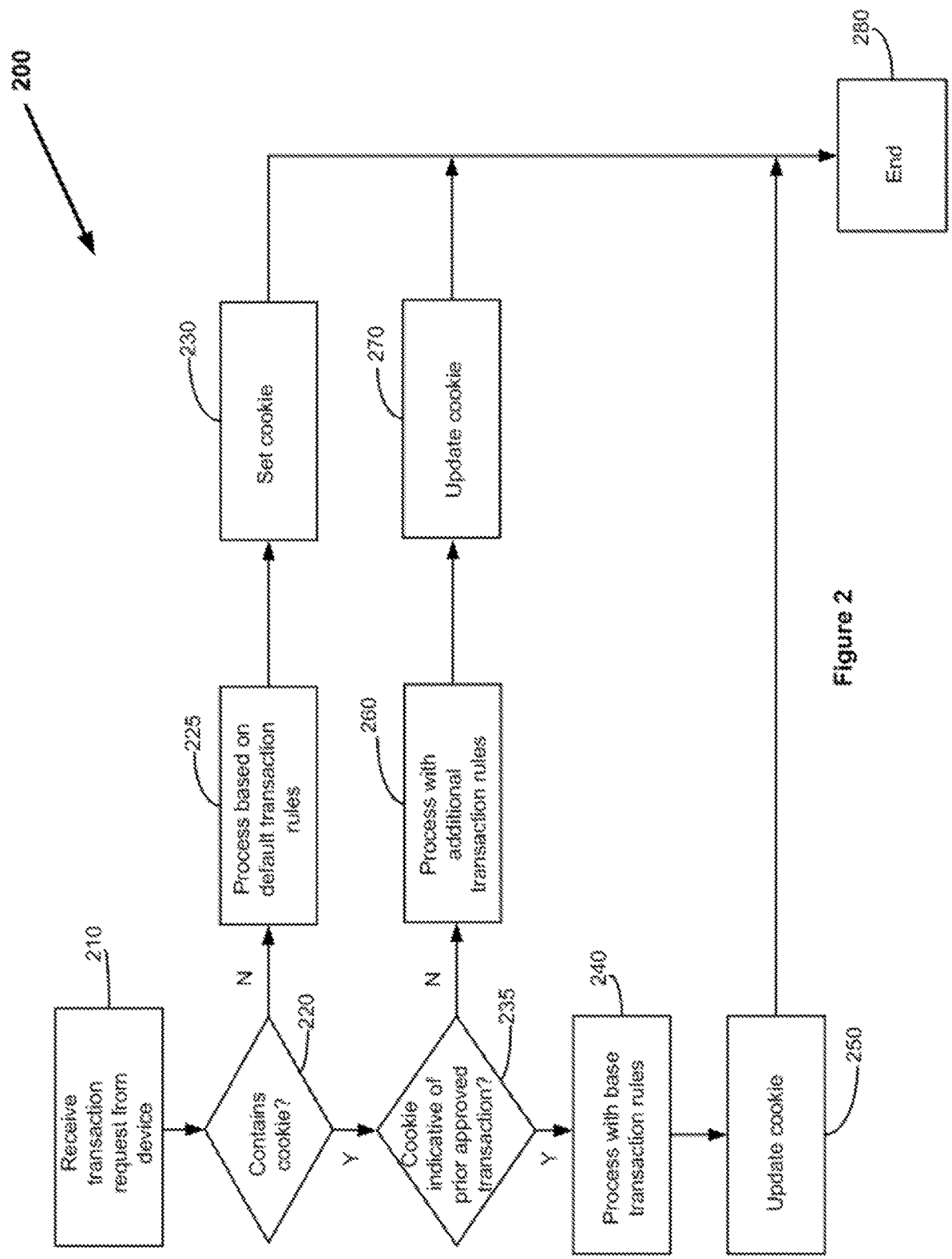
FIG. 2 is a flow chart of a method of an embodiment.

Referring to FIG. 2, there is shown a method in accordance with one embodiment of the invention. In the method 200 a transaction request is received from the device 210. It is then determined whether the browser contains a cookie. If the browser does not contain a cookie then the transaction is processed based on default transaction rules 225 and a cookie is set 230 in the browser for use in future transactions before the processing ends 280. In one example, the default transaction rules may include additional validation processing steps to a base set of rules used when the cookie indicates that a prior transaction has been approved.

If it is determined 220 that the transaction request contains a cookie (in the sense that a cookie can be retrieved from the browser) it is determined whether the cookie is indicative of the prior approved transaction 235. If it is not indicative of a prior approved transaction, the request is processed with additional transaction rules 260 and the cookie is updated 270 and the process ends 280. If the cookie is indicative of a prior transaction that has been approved, it is processed in accordance with base transaction rules 240 and the cookie is updated 250.

Scoring

In one example, scoring is based on data obtained by the processing system 130 from the user's device. For example, the transaction may involve a customer placing a request to purchase a physical product on a web site managed by the transaction processing system 130. The device "appearing" to be presented by the customer is an Apple iPhone 4S with iOS 6.1 software installed. Also derived from the device are other ID markings such as:

name of the device (e.g. the user's iTunes user name)
  telecommunication network provider (the entity that provides the phone service to the user)
  network carrier (the entity that provides the physical infrastructure used by the telecommunication network provider (which may be the same or different)

serial number of the device
capacity of the device
network carrier's operating system version
WiFi address used for the transaction (if used)
Bluetooth address of the device (if turned on)
IMEI (International Mobile Station Equipment Identity) number
ICCID number (a SIM (subscriber identification module) card serial number
modem firmware version The above list is specifically for an Apple iPhone.

However, as discussed above, the list would vary based on the device.

The above information is recorded to the extent that it is complete. Some fields for each device ID list are mandatory and some are not and this may differs for different devices. For example, the WiFi address and Bluetooth address of an iPhone device are not mandatory as, in order to collect them, both services need to be turned on. Where these fields are completed, this adds positively (in the sense of improving) an initial score for the first identification data.

For example, the transaction scorer 144 of processing system 130 may initially score an iPhone 5 with all of the above fields with a score of 0 points if the total device information possible is retrieved. (A lower score being treated as more indicative that the device is trustworthy). If the WiFi field was not populated but an IP address was received along with the incoming details then the device may be treated as suspicious and granted a score of 25 points.

In one example, the device details are matched internally against existing device details. In one example, the score may be decreased based on the number of transactions previously presented where that particular device was used and the transactions either failed or were considered of a fraudulent nature. Alternatively, a device ID may have been presented previously and have been used in multiple successful transactions. Over time, those individual transactions begin to garner their own score weighting to the initial score. A successful transaction using a particular device ID that was performed 9 months ago and has not had a chargeback or refund against it has a negative score against it (say −5), whereas a successful transaction performed on the current date may only receive −1 points. The reason for the different scores is that, although a transaction today is successful, a bank may apply a chargeback against the transaction anywhere (generally) up to 180 days past the date of the transaction. In this way a score can reflect more than one transaction outcome.

Points are also allocated based on the outcome of the transaction itself. In this respect transactions can be allocated into different categories with associated point scores such as completed successful, completed declined, completed fraud risk, completed with velocity breach, abandoned, etc.

In an alternative embodiment, these categories can be the outcome data. That is, instead of the transaction being scored, a category can be allocated to it and stored in the cookie as the outcome data.

Persons skilled in the art will appreciate that in accordance with known techniques, functionality at the server side of the network may be distributed over a plurality of different computers, for example for load balancing or security.

Further aspects of the method will be apparent from above description of the system. It will be appreciated that at least part of the method will be implemented electronically, for example, digitally by a processor executing program code. In this respect, in the above description certain steps are described as being carried out by the system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by a processor.

Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A method of processing transaction requests in an electronic transaction processing system, the method comprising:
    processing a first transaction request from a user device with the transaction processing system:
    calculating a first score indicative of an outcome of the first transaction request according to predefined transaction scoring rules;
    generating first outcome data including the first score;
    setting a cookie including the first outcome data in a browser application of the user device;
    subsequently, receiving a second transaction request from the user device at the transaction processing system in respect of a product;

obtaining, by the transaction processing system, the cookie stored in the browser application of the user device in order to retrieve the first outcome data;

in response to obtaining the cookie stored in the browser application, automatically selecting, by the transaction processing system based on the first outcome data, between a plurality of different available transaction processes by determining to which of the plurality of transaction processes the first score corresponds, wherein at least a first transaction process of the plurality of different available transaction processes contains at least one of an additional validation process or an alternative validation process relative to a second transaction process of the plurality of different available transaction processes;

processing the second transaction request in a transaction processor in accordance with the selected transaction process, including by processing the second transaction request in accordance with the first transaction process upon the first score corresponding to the first transaction process and by processing the second transaction request in accordance with the second transaction process upon the first score corresponding to the second transaction process;

calculating a second score indicative of an outcome of the second transaction request; and according to the predefined transaction scoring rules;

generating second outcome data including the second score; and updating the cookie in the browser application of the user device, such that the updated cookie comprises the second outcome data.

2. A method as claimed in claim 1, wherein the transaction processing system has a memory storing a plurality of ranges of scores in association with respective transaction processes such that any score uniquely corresponds to a transaction process.

3. An electronic transaction processing system for processing a transaction request, the transaction processing system arranged to receive at least a first transaction request and a second transaction request from user devices, the transaction processing system comprising:

a transaction scorer for scoring transaction requests, the transaction scorer configured to:
  score transaction requests received from user devices, and
  generate, for each transaction request, outcome data including a score indicative of at least an outcome of the transaction request;
a cookie setter configured to set or update cookies on user devices, wherein for a particular transaction request, a cookie in a browser application on an associated user device is set or updated to include the outcome data associated with the particular transaction request;
a cookie retriever configured to obtain cookies stored in the browser applications of user devices in response to receipt of a transaction request from the associated user device, in a case where said cookie is stored in the browser application of user device;
a processing setter configured to select, automatically for each transaction request and based on the retrieved outcome data, between a plurality of different available transaction processes by determining to which of the plurality of transaction processes the first score corresponds wherein at least a first transaction process contains at least one of an additional validation process or an alternative validation process relative to a second transaction process; and a transaction processor configured to process each transaction requests in accordance with the selected transaction process for the particular transaction request including by processing the second transaction request in accordance with the first transaction process upon the first score corresponding to the first transaction process and by processing the second transaction request in accordance with the second transaction process upon the first score corresponding to the second transaction process, wherein the transaction scorer scores a subsequent transaction request from a particular user device to generate subsequent outcome data including a newly calculated score based on an outcome of the subsequent transaction request, and wherein the cookie setter updates the cookie in the browser application of the particular user device comprising the newly calculated outcome data.

4. A transaction processing system as claimed in claim 3, comprising a memory storing a plurality of ranges of scores in association with respective transaction processes such that any score uniquely corresponds to a transaction process.

5. A non-transitory tangible computer readable medium comprising computer program code which when executed by a processor implements the method of claim 1.

6. The method as claimed in claim 1, wherein a transaction process corresponding to a transaction outcome with a status "completed fraud risk" involves s a higher detail of scrutiny outcome data than a transaction process corresponding to a transaction outcome with a status of "completed successful".

7. The transaction processing system as claimed in claim 3, wherein a transaction process corresponding to a transaction outcome with a status "completed fraud risk" involves s a higher detail of scrutiny outcome data than a transaction process corresponding to a transaction outcome with a status of "completed successful".

8. The method as claimed in claim 1, wherein upon, prior to the processing of the first transaction request there is no cookie stored in the browser application of the user device, the method comprises processing the first transaction request based on default transaction rules and subsequently setting a cookie.

9. The method as claimed in claim 8, wherein upon the first outcome data indicating that the first transaction request was approved, selecting the transaction process comprises selecting a transaction process with a base set of transaction rules, wherein the default transaction rules include additional validation processing steps to the base set of transaction rules.

10. The transaction processing system as claimed in claim 3, wherein upon, prior to the processing of a particular transaction request there is no cookie stored in the browser application of the associated user device, the transaction processor processes the first transaction request based on default transaction rules and a cookie is set on the associated user device.

11. The transaction processing system as claimed in claim 10, wherein upon the first outcome data indicating that the first transaction request was approved, the process setter selects a transaction process with a base set of transaction rules, wherein the default transaction rules include additional validation processing steps to the base set of transaction rules.

12. The method of claim 1, wherein the first outcome data further includes a transaction state indicative of an end outcome of the first transaction.

13. The method of claim 12, wherein the second outcome data further includes a transaction state indicative of an end outcome of the second transaction.

14. The method of claim 13, wherein the cookie comprises the first outcome data as a masked N digit number, where N is less than a total number of digits stored in the cookie, and when updated, the second outcome data as a masked N digit number.

15. The system of claim 3, wherein the outcome data further includes a transaction state indicative of an end outcome of the associated transaction.

16. The system of claim 15, wherein the cookie comprises the outcome data as a masked N digit number, where N is less than a total number of digits stored in the cookie.

17. The method of claim 1, further comprising detecting whether a format of the cookie in the user device has been tampered with, wherein selecting between the plurality of different available transaction processes is automatically enabled in response to detecting tampering of the format of the cookie.

18. The system of claim 3, wherein the cookie retriever is configured to detect whether a format of the cookie has been tampered with, and wherein the processing setter is configured to be automatically enabled to select between the plurality of different available transaction processes in response to detection of tampering of the format of the cookie.

* * * * *